US005999394A

United States Patent [19]

Dias

[11] Patent Number: 5,999,394

[45] Date of Patent: Dec. 7, 1999

[54] TERMINAL BLOCK FOR A PROTECTIVE RELAY

[75] Inventor: Clive Dias, Pickering, Canada

[73] Assignee: General Electric Company, Schenectady, N.Y.

[21] Appl. No.: 09/090,958

[22] Filed: Jun. 5, 1998

[51] Int. Cl.[6] .......................... H02H 1/00

[52] U.S. Cl. .......................... 361/119; 361/56; 361/93; 361/118

[58] Field of Search .......................... 361/56, 118, 115, 361/93, 119; 439/717

[56] References Cited

U.S. PATENT DOCUMENTS 4,872,855 10/1989 Norden .......................... 439/717

*Primary Examiner*—Stephen W. Jackson

*Attorney, Agent, or Firm*—Thomas M. Blasey; Carl B. Horton

[57] ABSTRACT

A modular terminal block for connection between an electrical distribution system and the processing circuitry of a protective relay. The terminal block includes multiple separable tiers, each which is provided with a set of terminal connections and signal contacts. The tiers are of different lengths such that each set of terminal connections are located at different distances from the protective relay to improve accessibility. The terminal block can be mounted in different orientations, and allow shorting between any two adjacent terminal connections.

25 Claims, 4 Drawing Sheets

TERMINAL BLOCK FOR A PROTECTIVE RELAY

CROSS-REFERENCE TO RELATED APPLICATIONS

The present application is related to the following copending, commonly-assigned applications:

FIELD OF THE INVENTION

The present invention relates to protective relays for providing protective control to electrical distribution systems. More particularly, the present invention relates to terminal connections which connect the relay circuitry to the electrical distribution system.

BACKGROUND OF THE INVENTION

Protective relays for electrical distribution systems provide numerous functions relating to protective control, including over-current and under-voltage protection, and are essential elements of any electrical distribution system. Protective relays include internal processing circuitry which monitors the portion of the electrical distribution system with which it is associated (e.g., a feeder line) and provide protection and control functions as necessary. Conventional protective relays include digital circuitry in which logic functions determine the operation of the relay, such that the relay will operate to provide protective control under certain specified, potentially hazardous conditions.

Protective relays must be operatively connected to the electrical distribution system to be monitored. Such connections between the internal circuitry of the protective relay and the electrical distribution system are conventionally established by terminal blocks. The terminal blocks, when the protective relay is associated with a current transformer, enable the relay to short-circuit the terminals of the transformer.

Conventional terminal blocks provide staggered connection terminals to improve user accessibility. However, due to the number of possible connection schemes between a protective relay and an electrical distribution system, staggered terminals may not provide adequate user accessibility.

Further, the connection terminals of conventional terminal blocks, even if staggered, are typically fixed in configuration. Terminal blocks providing flexible mounting arrangements would be desirable, though conventional terminal blocks do not adequately provide such a capability.

Further, conventional terminal blocks do not allow shorting capabilities to be configurable for multiple positions and in any location in the block.

SUMMARY OF THE INVENTION

The present invention overcomes the above-noted deficiencies, and achieves other advantages, by providing for a protective relay terminal block configurable in a plurality of tiers, each tier being a different length, such that the relay connections associated with each tier are a different distance from the protective relay to improve accessibility.

An exemplary terminal block according to the present invention includes a plurality of separable, modular tiers. Each tier has a first end provided with terminal connections for electrical connection to an electrical distribution system. A second end, opposite the first end, is provided with a set of contacts for electrical connection to signal terminals of a module in a protective relay. Each tier has a different length between the first and second ends. Each tier can be provided with at least one dovetailed alignment element which allows the tier to be slidably engaged with a dovetailed alignment element of an adjacent tier to engage adjacent tiers.

According to another aspect of the present invention, an exemplary protective relay includes relay processing circuitry for performing protection and control functions in an electrical distribution system, and at least one terminal block. Each terminal block has a plurality of separable tiers. Each tier has a first end provided with terminal connections for electrical connection to the electrical distribution system, and a second end opposite the first end is provided with a set of contacts for electrical connection to the relay processing circuitry. Each of the plurality of tiers has a different length between the first and second ends.

According to either aspect of the present invention, an exemplary terminal block can optionally include shorting fingers electrically connected to each contact, each shorting finger configured so as to contact a shorting finger associated with an adjacent contact when there is no module connected to the terminal block. Each terminal connection can be implemented by a screw which attaches a contact to the terminal block at the first end of its associated tier. Each contact preferably extends beyond the second end of its associated tier by a substantially uniform length.

A terminal block according to the present invention advantageously provides enhanced user accessibility as at least one result of the variable number of modular tiers. Further, the terminal block can be mountable in multiple orientations (e.g., left or right), and can be configured, using appropriate shorting fingers, to provide shorting between any two adjacent terminal connections.

BRIEF DESCRIPTION OF THE DRAWINGS

The present invention can be understood more clearly upon reading the following Detailed Description of Preferred Embodiments in conjunction with the accompanying drawings, in which like reference indicia designate like elements, and in which.

DETAILED DESCRIPTION OF PREFERRED EMBODIMENTS

Figure 1:
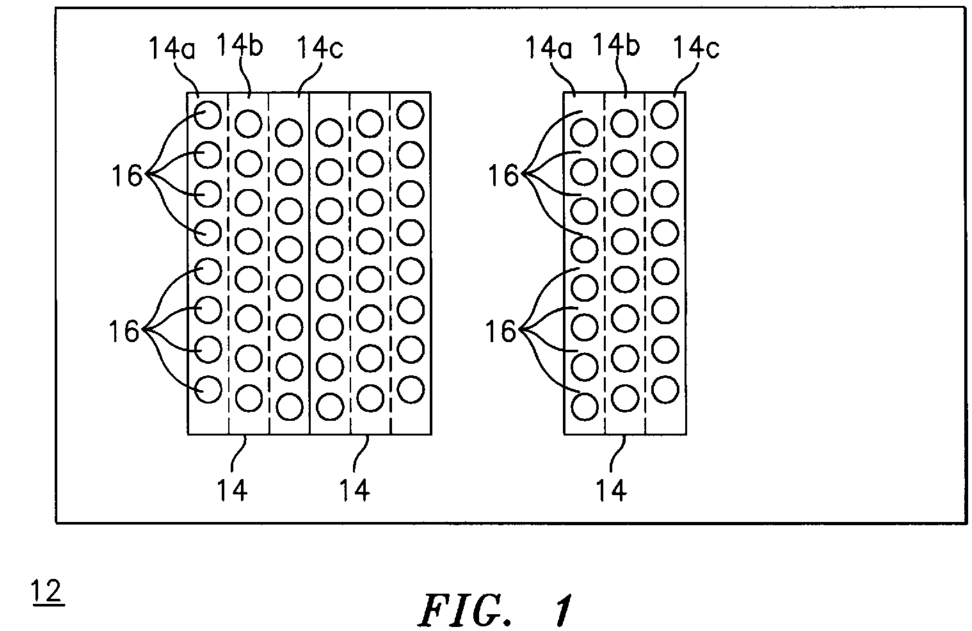
FIG. 1 is a view of a relay connection interface showing the terminal connections for connecting the relay to an electrical distribution system.

FIG. 1 shows a relay connection interface 12 including terminal blocks 14 provided with terminal connections 16 for connecting the relay to an electrical distribution system (not shown). The interface 12 would typically be provided on a surface of a relay housing. As shown in FIG. 1, and as will be shown in more detail later, the terminal blocks 14 can have three tiers, or levels 14*a–c,* each tier being provided with terminal connections. Each tier has a different length, such that each row of terminal connections is located a different distance from the surface of the relay housing. By providing terminal connections at varying distances from the surface of the relay housing, the present invention increases user accessibility to the terminal connections. Further, as shown in FIG. 1, terminal blocks according to the present invention can be mounted facing in multiple directions (e.g., either left or right). This aspect of the terminal block according to the present invention provides additional mounting flexibility over conventional terminal blocks.

Figure 2:
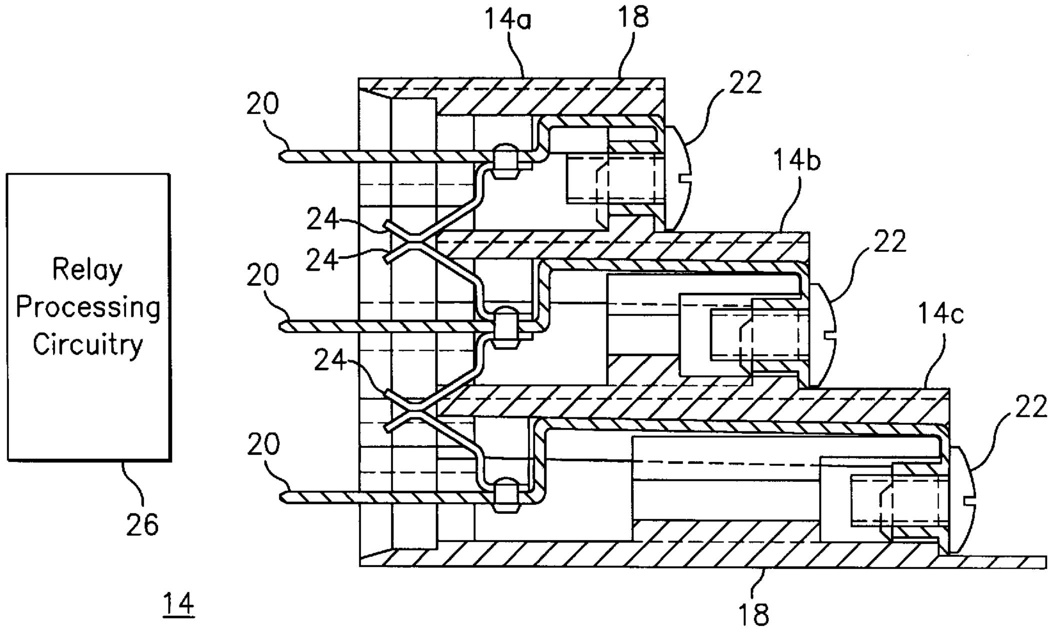
FIG. 2 is a profile view of a terminal block according to an embodiment of the present invention.

FIG. 2 is a cross-sectional profile view of an exemplary terminal block according to the present invention. The terminal block 14 in this example is comprised of three modular, separable tiers 14*a*, 14*b*, and 14*c*. It will be appreciated that, due to the modularity of the tiers, the number of tiers is easily varied. The construction of the tiers, and their assembly into the terminal block of FIG. 2, will be described in more detail below. Each tier includes a molded plastic portion 18, a contact 20, and a terminal connection screw 22. The terminal connection screw 22 screws into a mounting hole as shown in FIG. 2 and is mechanically and electrically in contact with the contact 20 at a first end. According to one exemplary embodiment, the terminal connection screw 22 provides a terminal connection capable of accepting #8 ring style terminals The contact 20, at a second end, extends beyond the surface of the terminal block 14 for electrical connection to the internal circuitry 26 of the protective relay.

According to an aspect of the present invention, each terminal block can optionally be provided with shorting fingers 24. The shorting fingers 24 are mechanically and electrically attached to an associated contact 20, and the shorting fingers of different contacts are shaped, mounted, and configured so as to come into contact with one another when the terminal block is not connected to relay monitoring and processing circuitry. The shorting fingers are particularly advantageous for use with modular relay circuitry, wherein each relay includes some variable number of modules which can be selectively mounted or removed to vary the functions of the relay. In operation, when a terminal block is not associated with a module, the shorting fingers of adjacent contacts will be in contact with one another to automatically short circuit the adjacent contacts. Alternatively, when the terminal block is connected to relay circuitry (e.g., by inserting or mounting a module onto the contacts 20), the shorting fingers are separated by a non-conductive element provided on the module to allow each contact 20 to be separately electrically connected to the relay processing circuitry. This function of the shorting fingers prevents the otherwise hazardous condition of "live" contacts, where one or more of the terminal screws 20 are electrically connected to the electrical distribution system, and where the contacts are not connected to any relay circuitry.

A second function of the shorting fingers is to allow shorting to occur between any two adjacent terminal connections on the block. To implement shorting between two desired terminal connections, shorting fingers are provided between appropriate adjacent signal contacts.

Figure 3A:
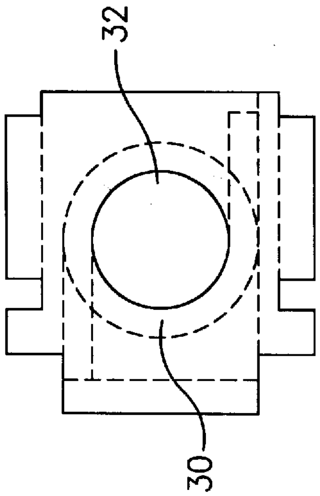
FIGS. 3A–C are a top, side, an front view, respectively, of a contact suitable for use in the terminal block of FIG. 2.
Figure 3C:
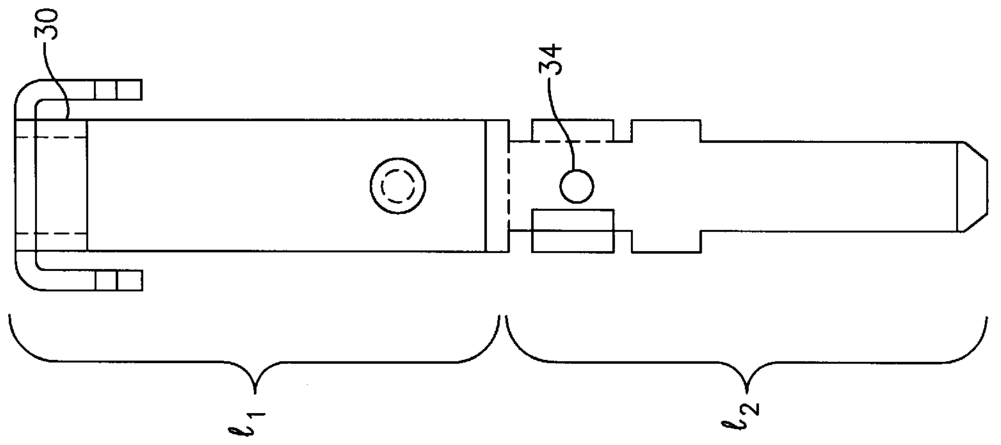
Figure 3B:
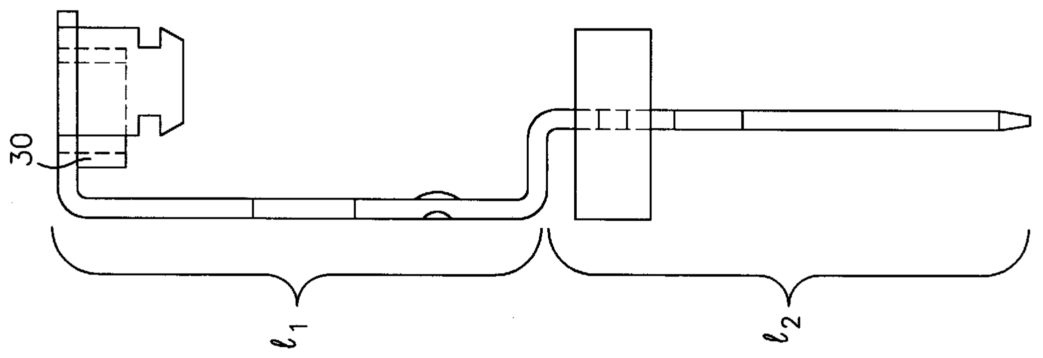

FIGS. 3A–C show a top view, side view, and front view, respectively, of a contact for use in the terminal block of FIGS. 1–2. The contact includes a seat portion 30 at a first end which cooperates with a corresponding seat portion of a tier element to be shown and described later. As shown in FIG. 3C, the seat portion 30 includes an aperture 32 through which a connector such as a terminal connection screw can be inserted to mechanically connect the contact to the tier element. The contact also includes a contact portion 20 at the opposite end from the seat portion which can be connected to the relay processing circuitry. It will be appreciated that in the example shown in FIGS. 3A–C, the contact portion 20 is configured to connect to a relay processing module, but that the contact portion can be modified as necessary to connect to virtually any type of relay processing circuitry.

The contact of FIGS. 3A–C is shown as having a second aperture 34. Such an aperture can be used to attach a shorting finger 24 to the contact, as will be described later in more detail.

The contact of FIGS. 3A–C includes two portions, a first of length $l_1$ and a second of length $l_2$. As will be described below, the length $l_1$ is selected based on the length of the tier with which the contact will be associated, and the length $l_2$ is substantially constant such that the contacts 20 of an assembled terminal block extend a substantially uniform and predetermined distance from the terminal block body. For example, a three-tier terminal block according to an embodiment of the present invention can include three different types of contacts, having three different $l_1$ lengths, depending upon the tier in which the contact is to be mounted, but each having the same $l_2$ lengths. The contact of FIGS. 3A–C is preferably formed as a stamping, and preferably can withstand a current of approximately 500 Amps for approximately one second. The contact 20 can be made of brass or other suitable conductive material.

Figure 4B:
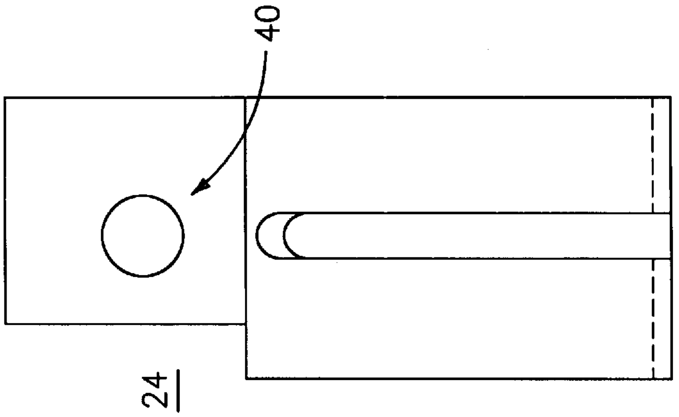
FIGS. 4A–B are side and front views, respectively, of a shorting finger suitable for use in the terminal block of FIG. 2.
Figure 4A:
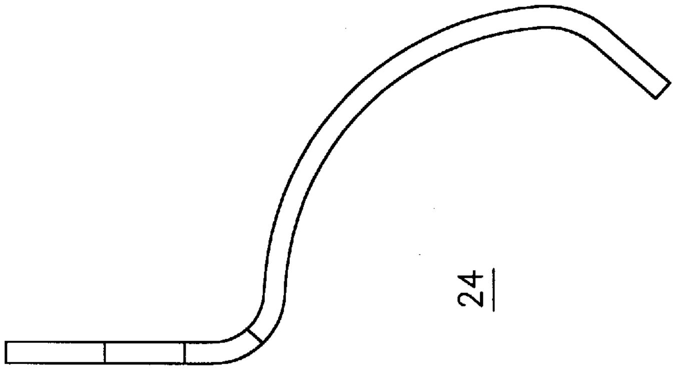

FIGS. 4A–B show a side and rear view, respectively, of a shorting finger 24 according to the present invention. The shorting finger 24 includes an aperture 40 (FIG. 4B) which can be aligned with the aperture of the seat portion 30 of an associated contact. The shorting finger can be attached to the contact by a rivet or other suitable means. The shorting finger 24 is preferably made of a conductive material, such as a BeCu alloy and, according to one example, has a thickness of approximately 0.016 inches. It will be appreciated that shorting fingers can be provided on all of the contacts, only a portion of the contacts, or none of the contacts in a terminal block, depending upon the particular application.

Figure 5A:
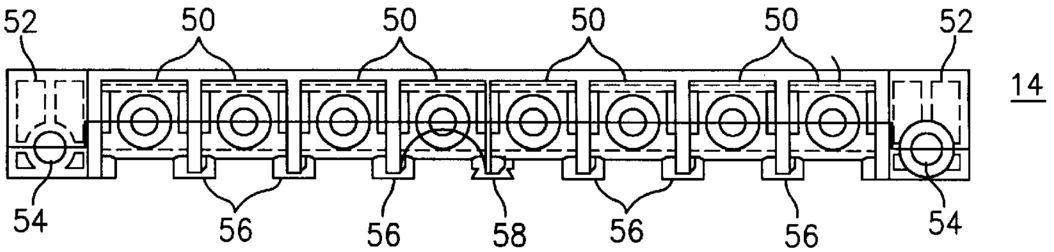
FIGS. 5A–C are top, front, and cross-sectional side views of a tier element suitable for use in the terminal block of FIG. 2.
Figure 5B:
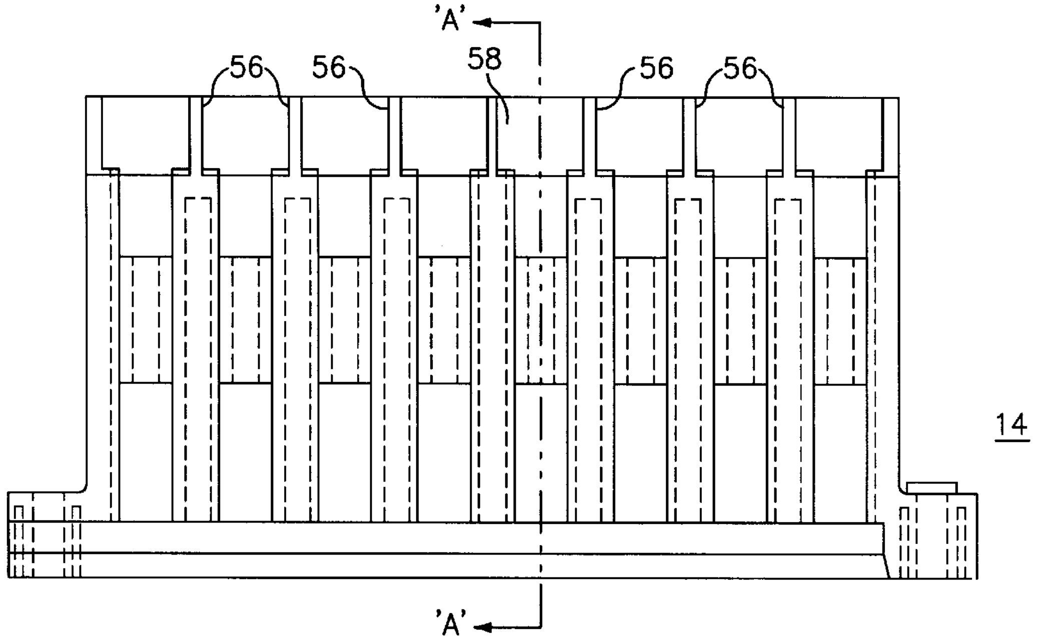
Figure 5C:
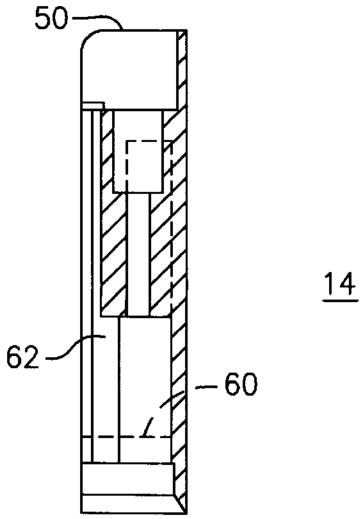

FIGS. 5A–C show a top, front, and cross-sectional view, respectively, of a tier element 14 to be assembled with a plurality of contacts, such as is shown in FIGS. 3A–C, to form a tier section of a complete terminal block, such as is shown in FIG. 2. As shown in FIG. 5A, the tier element includes seat portions 50, which correspond to the seat portions 30 of the contacts, for seating multiple contacts. The tier element also includes mounting portions 52, which are provided with mounting holes 54, which allow the terminal block to be mounted in a secure manner on the protective relay. The tier element further includes alignment elements 56 and dovetailed alignment elements 58. The dovetailed alignment elements 58 are formed so as to be slidably engageable with corresponding dovetail elements of adjacent tier elements, and the alignment elements 56 facilitate alignment with corresponding alignment elements of adjacent tier elements. The alignment elements, as shown in FIG. 5B, can extend along substantially the entire front surface, and can include alignment notches N, which cooperate with corresponding alignment notches of alignment elements of neighboring tier elements, to facilitate proper assembly of a multiple tier terminal block. In FIG. 5C, which is a cross-sectional side view along line A—A in FIG. 5B, seat portion 50 at one end of the tier element, and contact cavity 60 at the other end of the tier element. An elongated cavity 62 is provided between seat portion 50 and contact cavity 60 to accommodate the contact element shown in FIGS. 3A–C. It will be appreciated that the tier element shown in FIGS. 5A–C is an end tier element, which includes the elements 56 and 58 on only one side. In a multiple tier terminal block, middle tier elements would be provided with alignment elements and dovetailed alignment elements on each side of the tier element.

A multiple tier terminal block according to the invention can be assembled as follows. Tier elements having different lengths are fabricated of e.g., molded plastic. As shown and described above with respect to FIGS. 5A–C, each tier element can include a plurality of seat portions each having a first aperture for receiving a terminal connection screw. A number of electrically conductive contacts, such as are shown in FIGS. 3A–C, are inserted into the tier elements and press-fit into the tier element to achieve the bent configuration shown in the figures. Each contact includes a seat portion which is mounted in the corresponding seat portion of a tier element, and each contact has a midsection length corresponding to the length of the tier element. The contact elements are then secured to the tier element of corresponding length by inserting terminal connection screws through the apertures of the contact seat portions and the tier element seat portions. The contact elements can optionally be provided with shorting fingers, according to the particular relay application. Once a terminal block tier is formed, tiers (e.g., three) of different lengths are assembled by appropriately aligning the alignment elements on different length terminal block tiers, and slidably engaging the dovetail alignment elements to form the terminal block of FIG. 2. The assembled terminal block can then be mounted, in one of multiple orientations (e.g., left or right, vertical or horizontal, etc.), on a protective relay and secured to the protective relay by mounting screws inserted into the mounting holes 54. The assembled and mounted terminal block can then be connected to an electrical distribution system via the terminal connection screws, and can be connected to relay processing circuitry via the relay contact portions.

Because the tiers are separable and modular, the terminal block according to the present invention can include a variable number of tiers to enhance accessibility to the terminal connection screws. Thus, using tiers having 8 terminal connections each, terminal blocks can easily be assembled which provide 8, 16, 24, etc. terminal connections.

While the foregoing description includes many details and specificities, it will be understood that these are for illustrative purposes only and are not to be construed as limitations of the invention. Numerous modifications will be readily apparent which do not depart from the spirit and scope of the invention, as defined by the following claims and their legal equivalents.

What is claimed is:

1. A terminal block, comprising:

a plurality of separable, modular tiers, each tier having a first end provided with terminal connections for electrical connection to an electrical distribution system, and a second end opposite the first end, the second end provided with a set of contacts for electrical connection to signal terminals of a module in a protective relay, wherein each of the plurality of tiers has a different length between the first and second ends.

2. The terminal block of claim 1, further comprising shorting fingers electrically connected to contacts in different sets, each shorting finger configured so as to contact a shorting finger associated with an adjacent contact in a different set when there is no module connected to the terminal block.

3. The terminal block of claim 1, wherein each terminal connection includes a terminal connection screw which attaches a contact to the terminal block at the first end of its associated tier.

4. The terminal block of claim 1, wherein each contact extends beyond the second end of its associated tier.

5. The terminal block of claim 1, wherein there are a variable number of tiers.

6. The terminal block of claim 1, wherein there are three tiers.

7. The terminal block of claim 1, wherein the terminal block is mountable on the protective relay in multiple orientations.

8. The terminal block of claim 1, wherein the connection terminals and contacts can withstand a current of approximately 500 amps for approximately 1 second.

9. The terminal block of claim 1, wherein shorting can be provided between any two adjacent terminal connections.

10. The terminal block of claim 1, wherein each tier is provided with at least one dovetailed alignment element which allows the tier to be slidably engaged with a dovetailed alignment element of an adjacent tier to engage adjacent tiers.

11. The relay of claim 1, wherein each terminal block has three tiers, and each tier included eight terminal connections.

12. The terminal block of claim 1, wherein each tier is provided with at least one dovetailed alignment element which allows the tier to be slidably engaged with a dovetailed alignment element of an adjacent tier to engage adjacent tiers.

13. A relay having a terminal block, comprising:

relay processing circuitry for performing one or more protection and control functions in an electrical distribution system; and at least one terminal block, each terminal block having a plurality of separable, modular tiers, each tier having a first end provided with terminal connections for electrical connection to the electrical distribution system, and a second end opposite the first end, the second end provided with a set of contacts for electrical connection to the relay processing circuitry, wherein each of the plurality of tiers has a different length between the first and second ends.

14. The relay of claim 13, wherein the relay processing circuitry includes one or more replaceable modules.

15. The relay of claim 13, further comprising shorting fingers electrically connected to each contact, each shorting finger configured so as to contact a shorting finger associated with an adjacent contact when there is no relay processing circuitry connected to the adjacent contacts.

16. The relay of claim 13, wherein each terminal connection includes a terminal connection screw which attaches a contact to the terminal block at the first end of its associated tier.

17. The relay of claim 13, wherein each contact extends beyond the second end of its associated tier.

18. The relay of claim 13, wherein each terminal block is mountable on the relay in multiple orientations.

19. The relay of claim 13, wherein the connection terminals and contacts can withstand a current of approximately 500 amps for approximately 1 second.

20. The relay of claim 13, wherein shorting can be provided between any two adjacent terminal connections.

21. A method for assembling a terminal block for a protective relay, comprising the steps of:

molding a plurality of tier elements having different lengths, each tier element including a plurality of seat portions each having a first aperture for receiving a terminal connection screw;

inserting a plurality of electrically conductive contacts of different lengths into tier elements having different lengths, each contact including a corresponding seat portion at one end and a relay contact portion at another end, the corresponding seat portion having a second aperture for receiving a terminal connection screw;

press fitting the contacts into the tier elements;

inserting a plurality of terminal connection screws through the first and second apertures to form a terminal block tier having a tier length;

assembling two or more terminal block tiers of different tier lengths together to form a terminal block to be connected to an electrical distribution system via the terminal connection screws, and to be connected to relay processing circuitry via the relay contact portions.

22. The method of claim 21, further comprising the step of attaching a shorting finger to a plurality of contacts, each shorting finger configured so as to be in electrical contact with a shorting finger of an adjacent contact when no relay processing circuitry is connected to the relay contact portions.

23. The method of claim 21, further comprising the step of mounting the terminal block in a protective relay in any one of a plurality of orientations.

24. The method of claim 21, wherein the step of assembling is performed by slidably engaging a dovetailed alignment element on a first tier with corresponding dovetailed alignment element on a second tier.

25. The method of claim 21, wherein there are a variable number of tier elements in the terminal block.

* * * * *